United States Patent
Sawai et al.

(10) Patent No.: US 11,350,006 B2
(45) Date of Patent: May 31, 2022

(54) IMAGE FORMING APPARATUS THAT CALIBRATES A FOLDING POSITION

(71) Applicant: FUJIFILM BUSINESS INNOVATION CORP., Tokyo (JP)

(72) Inventors: Kenji Sawai, Kanagawa (JP); Shogo Tanaka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/155,817

(22) Filed: Jan. 22, 2021

(65) Prior Publication Data

US 2022/0021775 A1 Jan. 20, 2022

(30) Foreign Application Priority Data

Jul. 14, 2020 (JP) .............................. JP2020-120713

(51) Int. Cl.
*H04N 1/00* (2006.01)
(52) U.S. Cl.
CPC ....... *H04N 1/00639* (2013.01); *H04N 1/0066* (2013.01)

(58) Field of Classification Search
CPC ................................................. H04N 1/00639
USPC ......................................................... 358/400
See application file for complete search history.

(56) References Cited

U.S. PATENT DOCUMENTS

| 2009/0121407 | A1* | 5/2009 | Kawamura | ........ | G03G 15/6538 |
| | | | | | 270/32 |
| 2018/0359383 | A1* | 12/2018 | Tada | ..................... | G06K 9/4604 |
| 2019/0116292 | A1* | 4/2019 | Fujiki | ................... | G06T 1/0007 |

FOREIGN PATENT DOCUMENTS

| JP | H07-277593 A | 10/1995 |
| JP | 2000-153961 A | 6/2000 |

* cited by examiner

*Primary Examiner* — Jacky X Zheng
(74) *Attorney, Agent, or Firm* — Oliff PLC

(57) ABSTRACT

An image forming apparatus includes: a folder configured to fold a medium by forming a fold such that a side of the medium is aligned with a predetermined first position on the medium; and an image forming device configured to form a first image on a region different from a region located within a predetermined range from the first position, on at least a part of the side of the medium before the medium is folded by the folder.

14 Claims, 11 Drawing Sheets

IMAGE FORMING APPARATUS THAT CALIBRATES A FOLDING POSITION

CROSS-REFERENCE TO RELATED APPLICATIONS

This application is based on and claims priority under 35 USC 119 from Japanese Patent Application No. 2020-120713 filed Jul. 14, 2020.

BACKGROUND

(i) Technical Field

The present disclosure relates to an image forming apparatus.

(ii) Related Art

There is a technique of reading a medium folded by a folding machine with a scanner in a folded state so as to measure a deviation between a target folding position and an actual folding position from a read image. This measurement result is used for adjusting the folding machine, or the like.

For example, JP-A-2000-153961 discloses a monitoring device that transmits light through a signature formed by folding a piece of printing paper into plural sections while keeping the signature in the folded state and images the transmitted light, so as to monitor deviation of images that are formed in advance on respective pages of the signature and superimposed by the transmitted light.

Further, for example, JP-A-7-277593 discloses a folding accuracy inspection device that forms an inspection mark on a sheet so as to cross a folding line, folds the sheet to a predetermined size to form a signature, and detects, with a CCD camera or the like, a flat surface detection area disposed on a transport path of the signature at a position through which the inspection mark is to pass, so as to inspect a folding defect.

SUMMARY

Method for measuring a deviation of a folding position on a medium in a folded state are classified into (i) methods of estimating the deviation between a desired folding position and an actual folding position using a length of the medium in the folded state and (ii) methods of directly measuring a deviation in alignment of a medium on an opposite side to the folding position. Here, in a method of directly measuring a deviation between sides that are originally to be aligned from a read image obtained by reading a medium in a folded state, if there is no difference between an image of one side and an image of a part overlapped with the side, a position of the side cannot be specified and the measurement may be difficult.

Aspects of non-limiting embodiments of the present disclosure relate to enabling confirmation of a position of a side of a medium in a folded state.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus includes: a folder configured to fold a medium by forming a fold such that a side of the medium is aligned with a predetermined first position on the medium; and an image forming device configured to form a first image different from a region located within a predetermined range from the first position, on at least a part of the side of the medium before the medium is folded by the folder.

BRIEF DESCRIPTION OF THE DRAWINGS

Exemplary embodiment(s) of the present disclosure will be described in detail based on the following figures, wherein.

DETAILED DESCRIPTION

Exemplary Embodiment

Hereinafter, in the figures, a space in which each structure is disposed is represented as an xyz right-handed coordinate space. Among coordinate symbols shown in the figures, symbols with a dot drawn in a circle represent arrows from a back side to a front side of the paper, and symbols with two intersecting lines in a circle represent arrows from the front side to the back side of the paper. Directions along an x-axis in the space is referred to as "x-axis directions". Of the x-axis directions, a direction in which an x component increases is referred to as a "+x direction", and a direction in which the x component decreases is referred to as a "−x direction". For y and z components, a y-axis direction, a +y direction, a −y direction, a z-axis direction, a +z direction, and a −z direction are defined according to the above definitions.

Configuration of Image Forming Apparatus

Figure 1:
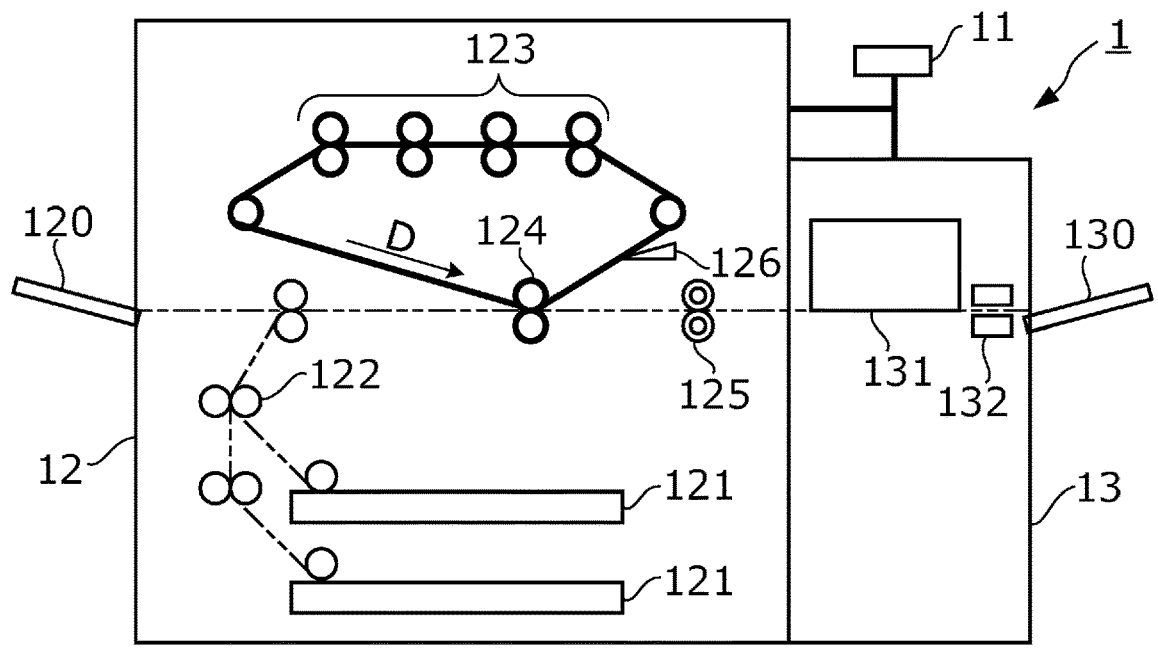
FIG. 1 is a diagram showing an example of an overall configuration of an image forming apparatus 1 according to an exemplary embodiment.

FIG. 1 is a diagram showing an example of an overall configuration of an image forming apparatus 1 according to the present exemplary embodiment. The image forming apparatus 1 shown in FIG. 1 includes a processor 11, an image forming device 12, and a post-processing device 13. In addition to the elements shown in FIG. 1, the image forming apparatus 1 may include an image reader that reads an image formed on a medium and generates image data indicating the image. The image forming apparatus 1 may include an operation unit that accepts a user's operation, a display that displays and conveys various information to the user, a communication unit that communicates with an external device, and the like.

The processor 11 shown in FIG. 1 is coupled to each unit of the image forming apparatus 1 via a bus or the like. The processor 11 controls the image forming device 12, the post-processing device 13, and other elements of the image forming apparatus 1 by reading and executing a computer program (hereinafter, simply referred to as a program) stored in a memory (not shown). The processor 11 is, for example, a central processing unit (CPU).

The image forming device 12 shown in FIG. 1 is a mechanism that forms an image by an electrophotographic process on a surface of a medium such as paper cut to a predetermined size. The image forming device 12 includes a sheet feeding tray 120, a container 121, a transport device 122, a developing device 123, a transfer device 124, a fixing device 125, and a cleaner 126.

The sheet feeding tray 120 is a table on which the medium such as paper to be manually fed to the image forming apparatus 1 is placed. The container 121 is a container that accommodates media such as paper. The media are not limited to paper, but may be, for example, resin sheets or the like. In short, the media may be any media having a surface on which an image can be formed.

The transport device 122 is a transport mechanism that transports the medium. The transport device 122 includes plural transport rollers. The transport rollers take out the media one by one from the sheet feeding tray 120 or the container 121, sandwich the medium, and transport the medium along a predetermined path. The transport device 122 causes the medium to pass through the transfer device 124 and the fixing device 125, and supplies the medium to the post-processing device 13.

The transport device 122 may include a reversing mechanism (not shown). In this case, the transport device 122 may invert the medium after the image is formed through the transfer device 124 and the fixing device 125, and then transport the medium to the transfer device 124 again, to form images on both sides of the medium.

The developing device 123 includes a photoconductor drum, a charging unit, an exposure unit, a developing unit, and primary transfer rollers. The exposure unit irradiates a surface of the photoconductor drum charged by the charging unit with laser light to form a latent image. The developing unit develops the latent image by supplying a developer to the latent image formed on the surface of the photoconductor drum. The primary transfer roller generates a predetermined potential difference at a position where an intermediate transfer belt of the transfer device 124, which will be described later, faces the photoconductor drum, and transfers the image developed on the photoconductor drum to the intermediate transfer belt by this potential difference.

A toner contained in the developer may be one type or plural types. The toner shown in FIG. 1 includes four colors of yellow, magenta, cyan, and black. The developing unit shown in FIG. 1 is provided for each toner color.

The transfer device 124 includes the intermediate transfer belt, a secondary transfer roller, belt transport rollers, and a backup roller. The transfer device 124 is a mechanism that transfers the image formed by the developing device 123 to a medium. The intermediate transfer belt is an endless belt member, is stretched on the plural belt transport rollers, and circulates in a direction of an arrow D shown in FIG. 1 as one of the belt transport rollers rotates. As a result, the image transferred from the primary transfer roller to the intermediate transfer belt described above moves to a region sandwiched between the secondary transfer roller and the backup roller, and is transferred to the medium transported to this region by the transport device 122.

The fixing device 125 includes a heating roller and a pressure roller. The heating roller and the pressure roller heats the medium while sandwiching and pressing the medium, so as to fix the transferred image to the medium.

The cleaner 126 removes an untransferred toner remaining on the surface of the intermediate transfer belt, under control of the processor 11. For example, the processor 11 may move the cleaner 126 to a position where the cleaner 126 is in contact with the intermediate transfer belt to perform cleaning every time the number of prints exceeds a predetermined threshold value.

The post-processing device 13 shown in FIG. 1 includes a folder 131, a reader 132, and a sheet discharging tray 130. The folder 131 is a mechanism that folds the medium supplied from the image forming device 12 under the control of the processor 11.

Figure 2A:
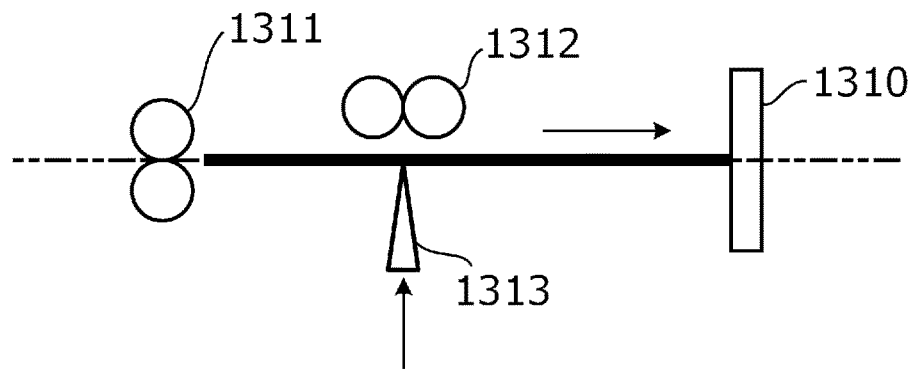
FIGS. 2A and 2B are diagrams showing an example of a configuration of a folder 131.
Figure 2B:
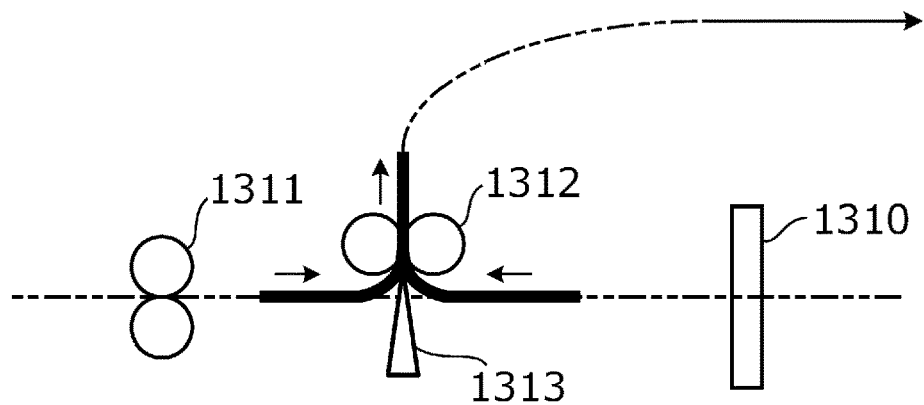

FIGS. 2A and 2B are diagrams showing an example of a configuration of the folder 131. The folder 131 shown in FIGS. 2A and 2B includes a gate 1310, a pair of transport rollers 1311, a pair of folding rollers 1312, and a knife-shaped folding member 1313.

For example, the folder 131 of the post-processing device 13 receives the medium on which the image is formed from the image forming device 12, sandwiches the medium between the pair of transport rollers 1311, and transports the medium toward the gate 1310. As shown in FIG. 2A, when this medium advances in an arrow direction and comes into contact with the gate 1310, the pair of transport rollers 1311 stops the transport of the medium.

Then, when the transport of the medium is stopped, as shown in FIG. 2B, the knife-shaped folding member 1313 advances while pushing one surface of the medium and pushes the medium between the pair of folding rollers 1312 disposed on a side of the other surface. As a result, the medium is folded by the pair of folding rollers 1312. The folded medium is transported in the folded state by a transport roller (not shown) to the reader 132 shown in FIG. 1 along an arrow shown in FIG. 2B with, for example, a fold at the beginning.

The folding members 1313 may be arranged on both sides of the medium. In this case, the pair of corresponding folding rollers 1312 may be simply disposed on the opposite side of each folding member 1313 with the medium interposed therebetween.

The reader 132 is a mechanism that reads the medium folded by the folder 131 in the folded state. The reader 132 may read only one side or may read both sides of the medium in the folded state. The reader 132 may include a medium reversing mechanism that reads both sides of the medium.

The sheet discharging tray 130 is a tray on which the medium formed with the image by the image forming device 12 and folded by the post-processing device 13 is placed.

EXAMPLES

Figure 3:
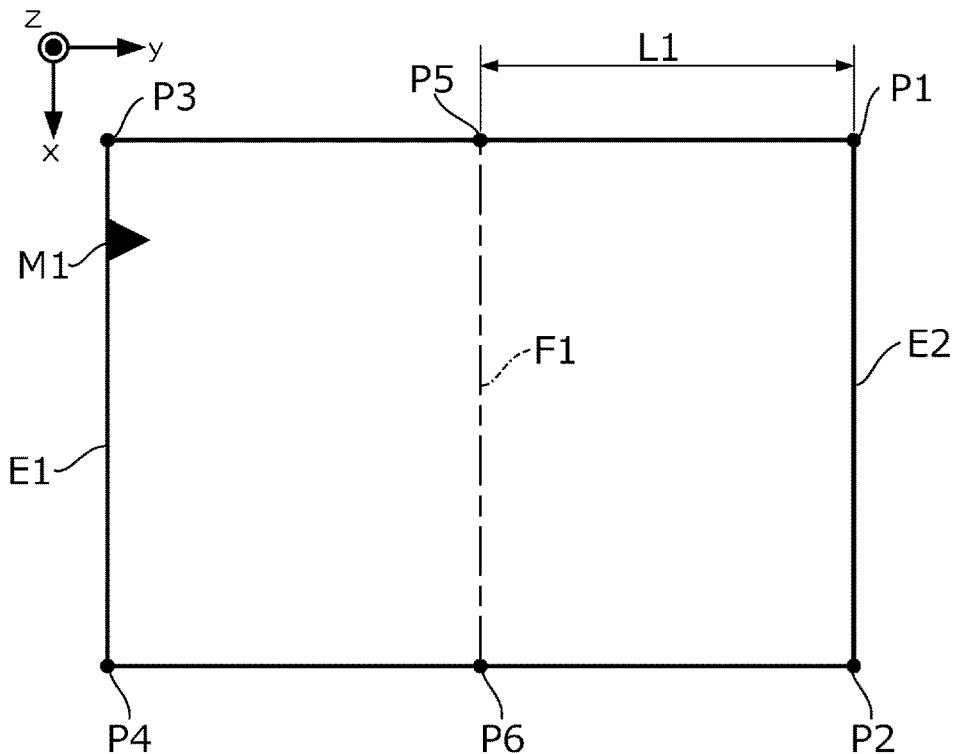
FIG. 3 is a diagram showing an example of a medium to be processed by the image forming apparatus 1.

FIG. 3 is a diagram showing an example of the medium to be processed by the image forming apparatus 1. FIG. 3 shows the medium arranged along an xy plane as viewed in the −z direction. This medium is in a state before being folded and has a rectangular shape.

All of a point P1, a point P2, a point P3, and a point P4 are corners of this medium. A side E1 is a side connecting the points P3 and P4 among the four sides of the medium. A side E2 is a side connecting the points P1 and P2 among the four sides of the medium, and is a side opposite to the side E1.

A point P5 is a midpoint of a side connecting the points P1 and P3, and a point P6 is a midpoint of a side connecting the points P2 and P4. A distance between the points P1 and P5, a distance between the points P5 and P3, a distance between the points P2 and P6, and a distance between the points P6 and P4 are all equal and are the same distance L1.

In the figures, a dot and dash line indicates a mountain folding, and a broken line indicates a valley folding. A dot and dash line connecting the points P5 and P6 shown in FIG. 3 indicates a mountain side of a fold F1 formed when the medium is folded in half.

Figure 4:
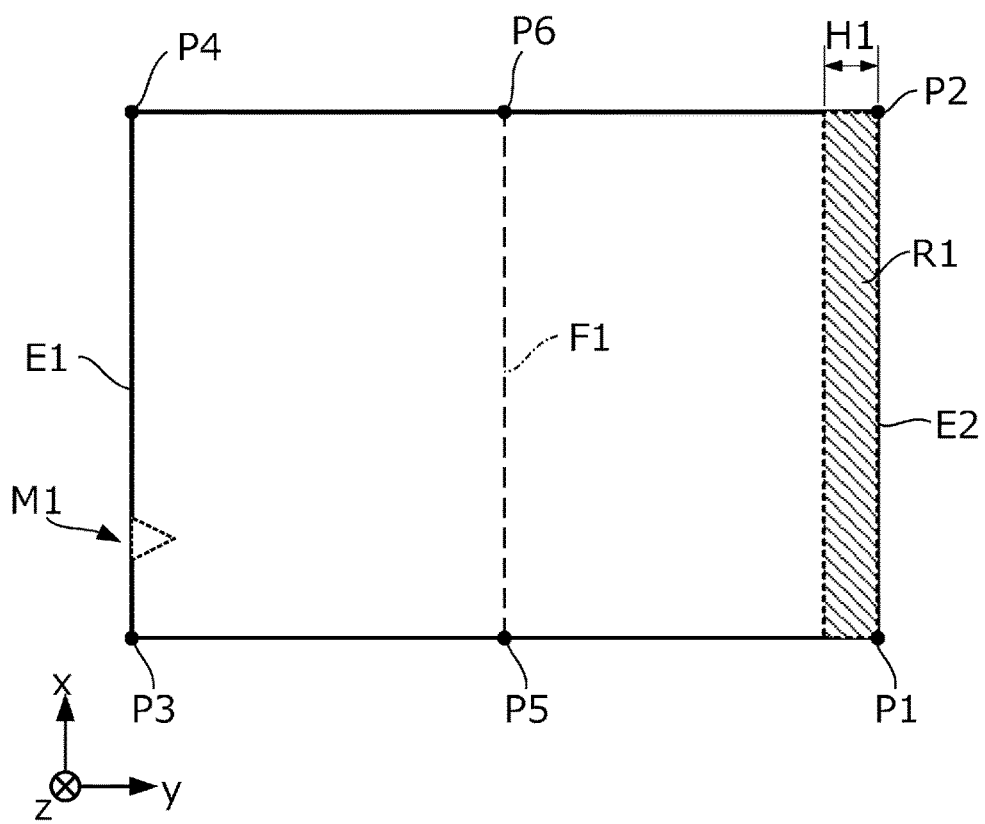
FIG. 4 is a view of the medium shown in FIG. 3 as viewed from an opposite side.

FIG. 4 is a view of the medium shown in FIG. 3 as viewed from an opposite side. FIG. 4 shows the medium arranged along the xy plane as viewed in the +z direction. In FIG. 4, a broken line connecting the points P5 and P6 indicates a valley side of the fold F1 formed when the medium is folded in half.

A region R1 is a region located within a predetermined range from the side E2 on a −z side surface of the medium. For example, the region R1 shown in FIG. 4 is a region whose distance from the side E2 is shorter than a distance H1.

A first image M1 is an image of a mark or the like formed on a part of the side E1 on a +z side surface of the medium by the image forming device 12. The first image M1 is, for example, an image whose density, lightness, hue, saturation, or the like is different from that of the region R1.

Since the side E1 is an outer edge of the medium, the image forming device 12 performs so-called borderless printing in which the first image is formed so as to cross the side E1 from the inside to the outside of the medium. For example, the developer carried at a position on the intermediate transfer belt corresponding to the outside of the medium and thus remaining without being transferred to the medium is removed from the intermediate transfer belt by the cleaner 126 described above.

As shown in FIG. 1, the image forming device 12 forms an image on the medium before being folded by the folder 131. Therefore, the image forming device 12 which forms the first image M1 is an example of an image forming device configured to form a first image on a region different from a region located within a predetermined range from the first position, on at least a part of the side of the medium before the medium is folded by the folder.

The medium on which the first image M1 is formed is folded in half by the folder 131 such that the side E1 is aligned with the side E2. As a result, the fold F1 is formed in this medium.

Figure 5A:
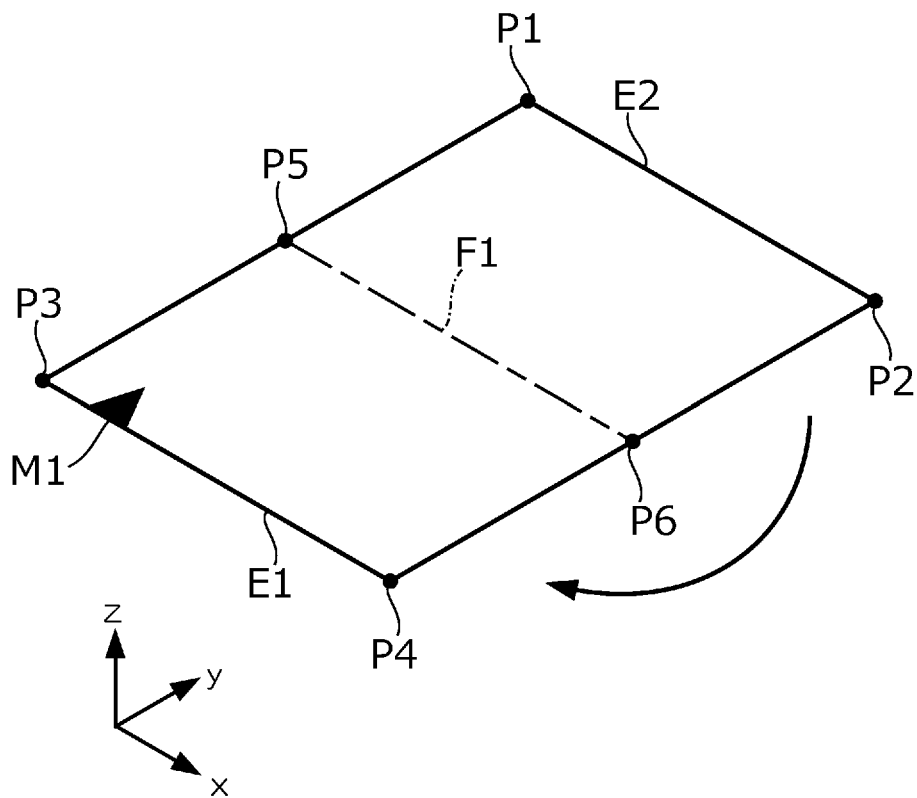
FIGS. 5A and 5B are perspective views showing a situation in which the medium is folded.
Figure 5B:
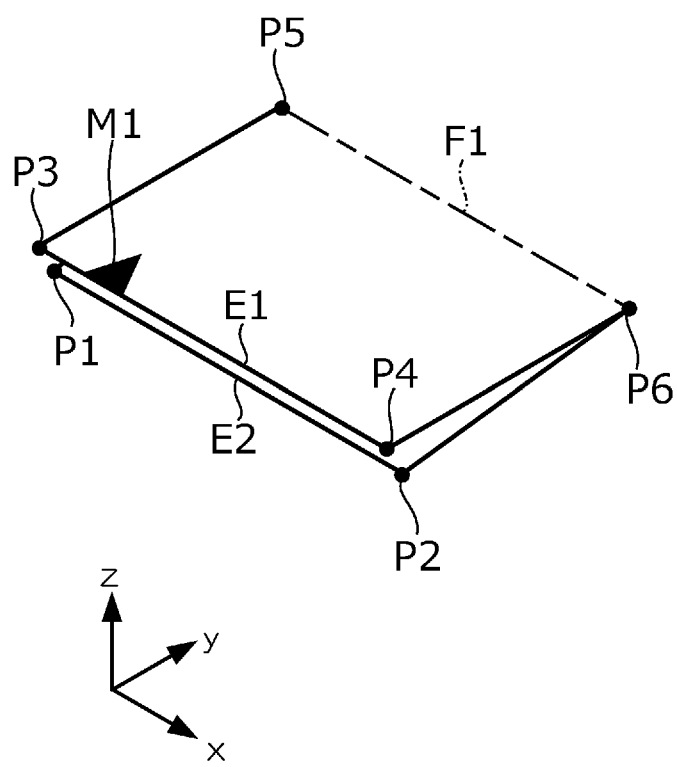

FIGS. 5A and 5B are perspective views showing a situation in which the medium is folded. The medium arranged along the xy plane is folded by the folder 131 such that the fold F1 is formed. At this time, since the medium is folded such that the +z side of the fold F1 is the mountain side, the side E2 moves in the −z direction and the −y direction an arrows and is aligned with the side E1, for example, as shown in FIG. 5A. As a result, as shown in FIG. 5B, the fold F1 is formed in the medium.

Here, the side E2 is an example of a predetermined position (referred to as the "first position") with which the side E1 is aligned. Therefore, the folder 131 that folds this medium as shown in FIGS. 3 and 4 is an example of a folder configured to fold a medium by forming a fold such that a side of the medium is aligned with a predetermined first position on the medium.

As shown in FIG. 5B, the side E1 is one of the two sides at an alignment position on the opposite side to the fold F1 which is a folding position on the medium in the folded state. Therefore, the image forming device 12 that forms the first image M1 on this side E1 is an example of an image forming device configured to form a first image on at least one side of two sides at an alignment position on an opposite side to a folding position on the medium.

When the medium is folded, the same image as the first image M1 formed on the one side E1 at the alignment position is not on the other side E2 at the alignment position. That is, the folder 131 is an example of a folder configured to fold the medium on which the first image is formed by the image forming device such that the same image as the first image formed on the at least one side of the two sides at the alignment position is not on the other side when the medium is folded.

Figure 6:
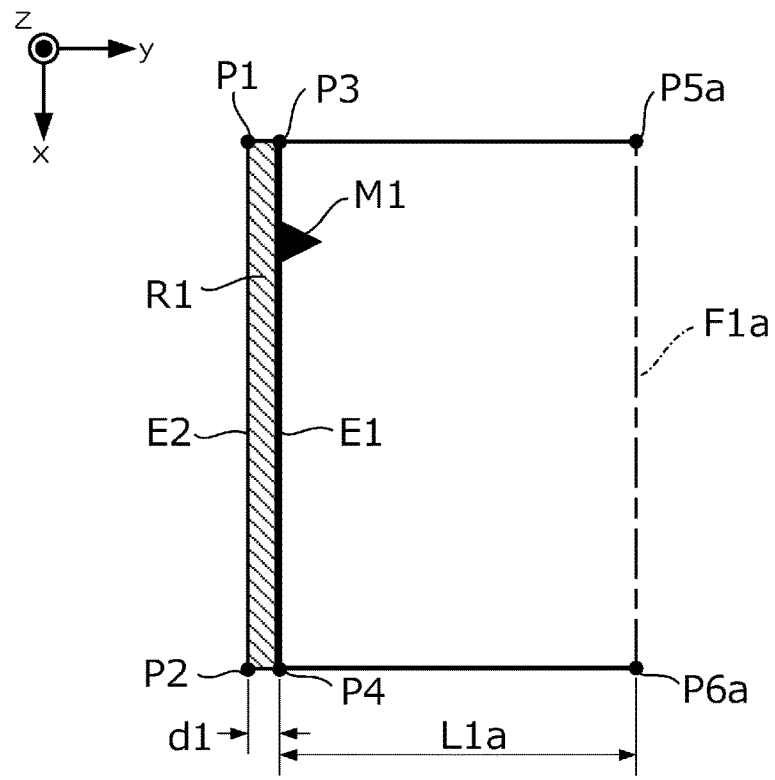
FIG. 6 is a diagram showing the medium when an actual fold deviates.

FIG. 6 is a diagram showing the medium when an actual fold deviates. Even if a folding method is set as shown in FIGS. 5A and 5B, when the folder 131 is actually folded, a fold that deviates from the setting is often formed.

For example, as shown in FIG. 6, a fold F1a actually formed by the folder 131 folding the medium has points P5a and P6a as both ends thereof, and deviates in the −y direction from the fold F1 shown in FIG. 3. When the medium in the folded state is viewed in the −z direction, as shown in FIG. 6, the side E1 overlaps the region R1, but is not aligned with the side E2, and a gap is formed between the side E1 and the side E2.

A distance of this gap along the y-axis direction is a distance d1 as shown in FIG. 6. A distance between the side E1 and the fold F1a along the y-axis direction is a distance L1a as shown in FIG. 6. Since a length of the medium along the y-axis direction when unfolded is twice the distance L1, the distance L1a can be obtained from the distance d1 and the distance L1 by the following equation (1).

$$L1a = L1 - d1/2 \tag{1}$$

Figure 7:
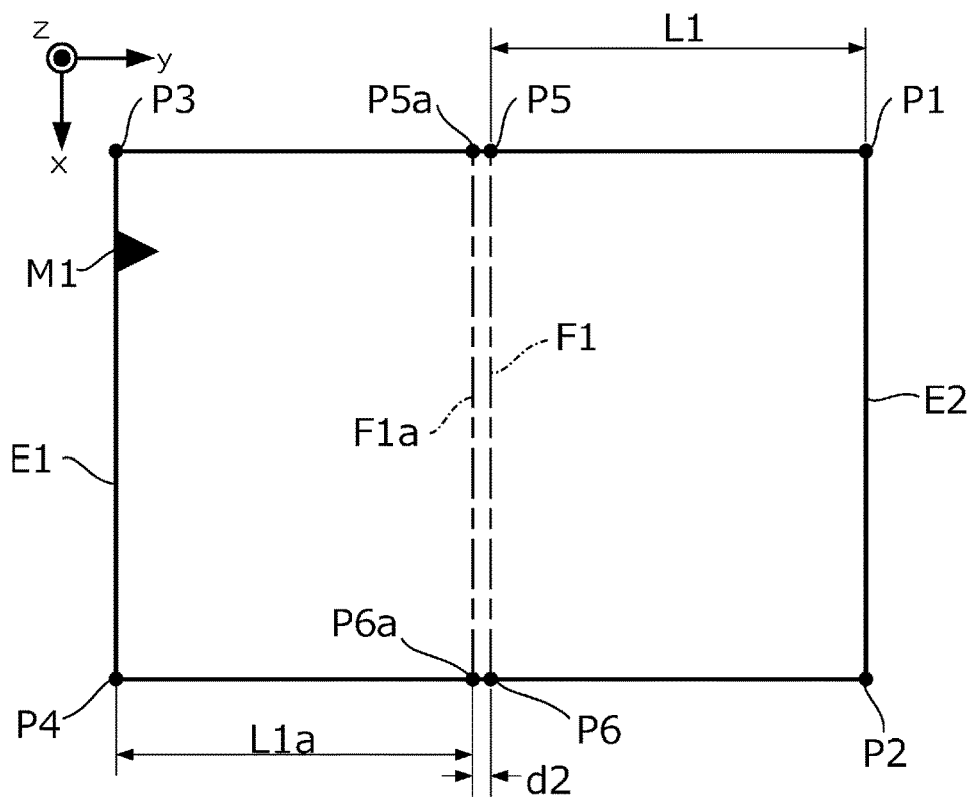
FIG. 7 is a diagram showing the medium in which a fold F1a shown in FIG. 6 is unfolded.

FIG. 7 is a diagram showing the medium in which the fold F1a shown in FIG. 6 is unfolded. As described above, the fold F1a actually formed by the folder 131 folding the medium deviates in the −y direction from the set fold F1, and the distance between the fold F1a and the set fold F1 along the y-axis direction is a distance d2 as shown in FIG. 7. Since a sum of the distance L1a and the distance d2 is the distance L1, the distance d2 can be obtained by the following equation (2) using the distance d1.

$$d2 = d1/2 \tag{2}$$

Consider a case in which the side E1 without the first image M1 formed is not different from the region R1 in density, lightness, or the like. In this case, when this medium is folded without forming the first image M1 thereon, the side E1 may be buried in the region R1, so that the position of the side E1 may not be specified. Since the image forming device 12 forms the first image M1 different from the region R1, the position of the side E1 is clearly specified from an image obtained by reading the medium in the folded state shown in FIG. 6.

When the reader 132 of the post-processing device 13 reads the medium in the folded state, the processor 11 acquires this read image. As described above, since the first image M1 is formed on the side E1, the processor 11 specifies the positions of the sides E1 and E2 from the read image, and measures the distance d1 indicating the deviation thereof in the y-axis direction.

Then, the processor 11 applies the measured distance d1 to the above equation (2) to estimate the distance d2, which is a distance for moving the fold. After estimating the distance d2, the processor 11 may adjust the folder 131 such that the position of the fold is moved in the +y direction by this distance d2. The processor 11 is an example of a processor configured to acquire an image obtained by reading the medium in a state of being folded by the folder, measure a distance between the first image and the first position from the acquired image, and adjust a position where the folder folds the medium according to the measured distance.

As described above, the image forming device 12 of the image forming apparatus 1 forms the first image M1, which is different from the region R1 within the predetermined range from the side E2 which is the first position, on at least a part of the side E1. Therefore, even when a deviation occurs between the sides E1 and E2 that are originally to be aligned on the medium folded by the folder 131 of the post-processing device 13, the position of the side E1 is clearly detected using a boundary between the region R1 and the first image M1. That is, the position of the side E1 when the side E1 overlaps the medium is less likely to be lost as compared with a case where the first image M1 different from the region R1 is not formed on at least a part of the side E1. Therefore, with the image forming apparatus 1 according to the exemplary embodiment, the position of the side of the medium is confirmed in the folded state.

Modifications

The above exemplary embodiment may be modified as follows. The following modifications may be combined with each other.

<1>

In the above exemplary embodiment, the image forming device 12 forms the first image M1 at one position on the side E1, but may also form the first image at each of two or more positions on the side E1.

Figure 8:
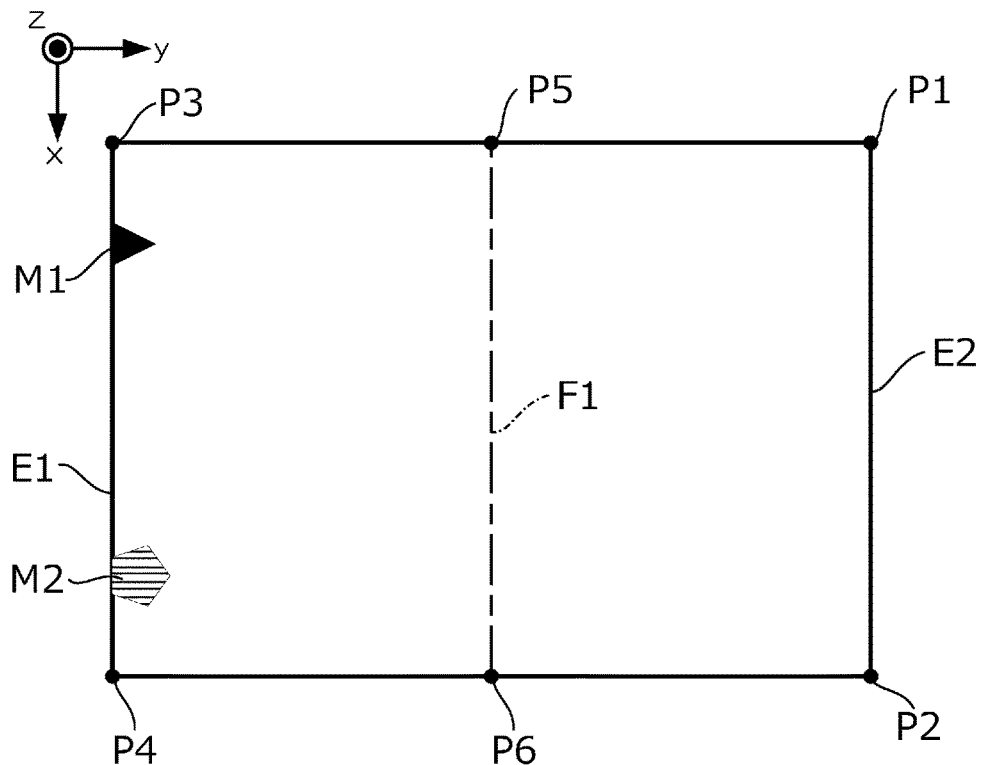
FIG. 8 is a diagram showing an example of a medium on which first image is formed at each of two or more positions on a side.

FIG. 8 is a diagram showing an example of a medium on which the first image is formed at each of the two or more positions on the side. In the medium shown in FIG. 8, the first image M1 and a first image M2 are respectively formed at two different positions on the side E1 by the image forming device 12.

Figure 9:
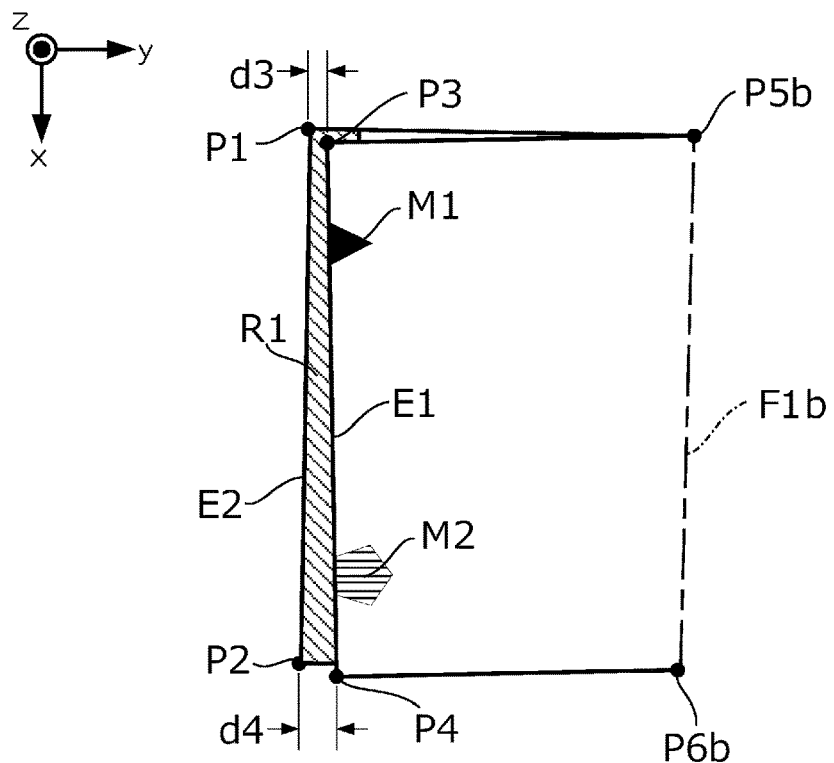
FIG. 9 is a diagram showing the medium when an actual fold deviates.

FIG. 9 is a diagram showing the medium when an actual fold deviates. As shown in FIG. 9, a fold F1b actually formed by the folder 131 folding the medium shown in FIG. 8 has points P5b and P6b as both ends thereof, and deviates in the −y direction from the fold F1 shown in FIG. 8. Further, a direction of the fold F1b is different from the direction of the fold F1.

When the medium in the folded state is viewed in the −z direction, as shown in FIG. 9, there is a gap between the side E1 and the side E2, and the side E1 and the side E2 are not parallel to each other. Therefore, the gap between the side E1 and the side E2 at an end portion in the −x direction is different from that at an end portion in the +x direction. For example, as shown in FIG. 9, a gap between the point P1 and the point P3 is a distance d3, and a gap between the point P2 and the point P4 is a distance d4.

The processor 11 specifies the positions and the directions of the sides E1 and E2 from the read image that is obtained by the reader 132 reading the medium shown in FIG. 9, using the first image M1 formed on the side E1. Then, the processor 11 measures the distances d3 and d4 from the read image, using the positions and the directions of the specified sides E1 and E2.

As described above, the image forming device 12 forms the first image M1 and the first image M2 at the two different positions on the side E1, respectively. Therefore, even when the sides E1 and E2 are not parallel in the folded medium, the position of the side E1 in the medium is made clear by connecting a boundary between the first image M1 and the region R1 and a boundary between the first image M2 and the region R1.

Therefore, for example, even when a so-called skew occurs in transporting the medium to the folder 131 and the medium is transported obliquely such that both the folding position and the direction deviate as shown in FIG. 9, the position and the direction of the side E1 are clearly detected. The image forming device 12 is an example of the image forming device is configured to form the first image at each of two or more positions on the side.

Figure 10:
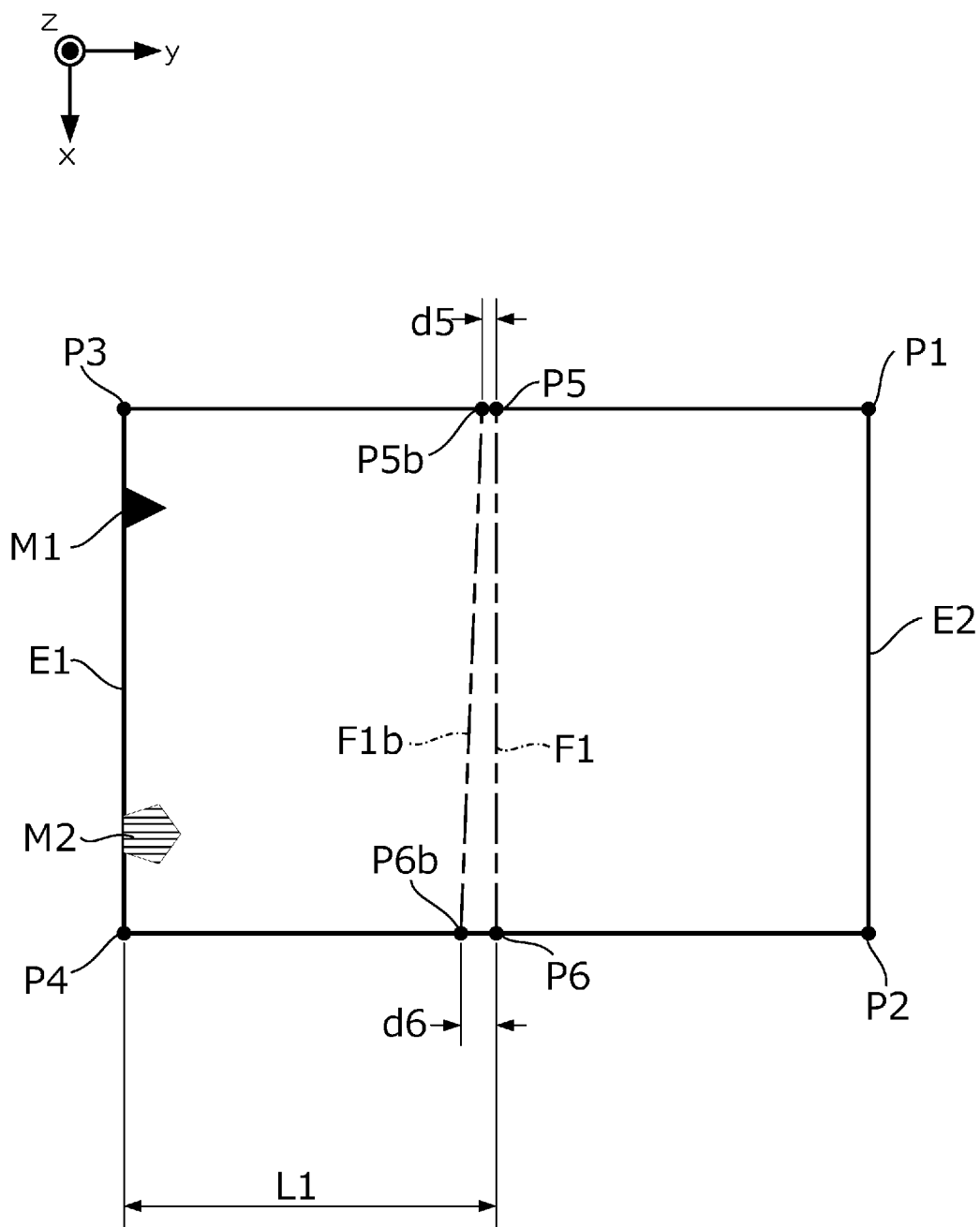
FIG. 10 is a diagram showing the medium in which a fold F1b shown in FIG. 9 is unfolded.

FIG. 10 is a diagram showing the medium in which the fold F1b shown in FIG. 9 is unfolded. As described above, since the fold F1b actually formed by the folder 131 folding the medium deviates in the −y direction from the set fold F1 and a direction of the fold F1b also deviates from that of the fold F1, a distance between the point P5b and the point P5 which are at the end portion of the fold F1b in the −x direction is a distance d5, and a distance between the point P6b and the point P6 which are at the end portion in the +x direction is a distance d6. These distances d5 and d6 may be calculated from the above distances d3 and d4.

Therefore, in this case, the processor 11 may use the measured distances d3 and d4 to estimate the distances d5 and d6, which are the distances for moving the fold, and adjust the folder 131 such that the position of the fold is moved accordingly.

<2>

In the above exemplary embodiment, the medium is folded in half by forming one fold, but may be folded by forming two or more folds.

Figure 11:
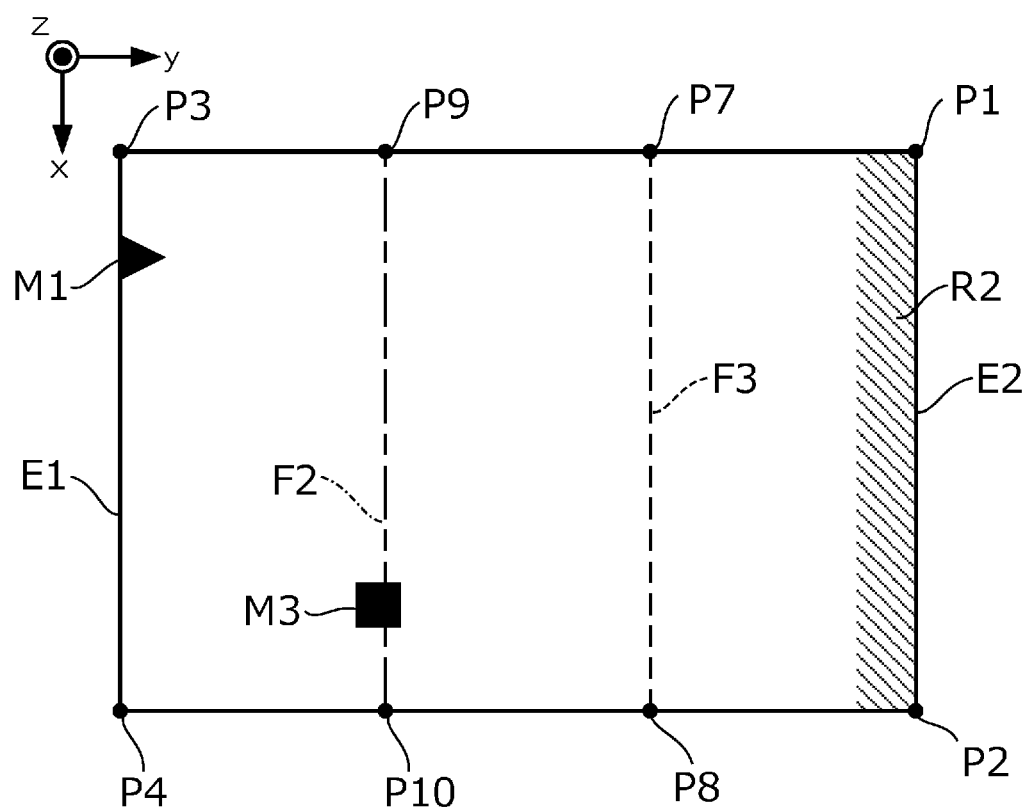
FIG. 11 is a diagram showing an example of a medium that it to be folded in three.
Figure 12:
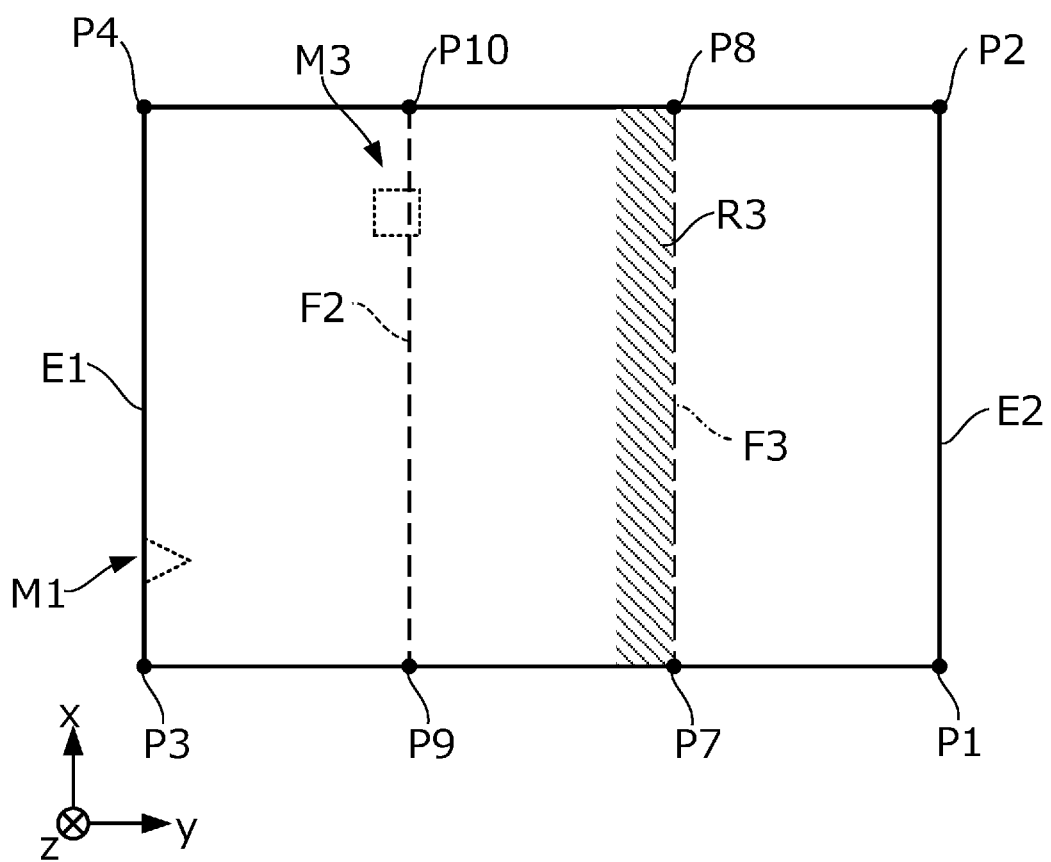
FIG. 12 is a view of the medium shown in FIG. 11 as viewed from the opposite side.

FIG. 11 is a diagram showing an example of a medium that is to be folded in three. FIG. 12 is a view of the medium shown in FIG. 11 as viewed from the opposite side. FIG. 11 shows a view of the medium arranged along the xy plane as viewed in the −z direction. This medium is in a state before being folded and has a rectangular shape.

The point P1, the point P2, the point P3, the point P4, the side E1, the side E2, and the first image M1 are common to those shown in FIG. 3. Points P9 and P7 shown in FIG. 11 are points that divide the side connecting the points P1 and P3 into three equal parts, and the point P9 is located in the −y direction with respect to the point P7. Points P10 and P8 shown in FIG. 11 are points that divide the side connecting the points P2 and P4 into three equal parts, and the point P10 is located in the −y direction with respect to the point P8.

A dot and dash line connecting the points P9 and P10 shown in FIG. 11 indicates a mountain side of a fold F2 formed when the medium is folded in three. A broken line connecting the points P7 and P8 shown in FIG. 11 indicates a valley side of a fold F3 formed when the medium is folded in three.

The folder 131 folds the medium such that the side E1 is aligned with the fold F3 (a first position in this modification). As a result, the fold F2 is formed in the medium. The folder 131 folds the medium at a position different from the fold F2 such that the fold F2 is aligned with the side E2 (a second position in this modification). As a result, the fold F3 is formed in the medium. Therefore, the folder 131 is an example of the folder is configured to fold the medium at a position different from the fold such that the fold is aligned with a predetermined second position on the medium.

A region R2 shown in FIG. 11 is a region located within a predetermined range from the side E2 on the +z side surface of the medium. For example, the region R2 shown in FIG. 11 is a region whose distance from the side E2 is shorter than a distance H2.

FIG. 12 shows the medium arranged along the xy plane as viewed in the +z direction. In FIG. 12, a broken line connecting the points P9 and P10 indicates a valley side of the fold F2 formed when the medium is folded in three. A dot and dash line connecting the points P7 and P8 shown in FIG. 12 indicates a mountain side of the fold F3 formed when the medium is folded in three.

A region R3 shown in FIG. 12 is a region located within a predetermined range from the fold F3 on the −z side surface of the medium. For example, the region R3 shown in FIG. 12 is a region whose distance from the fold F3 is shorter than a distance H3.

A first image M1 is an image of a mark or the like formed on a part of the side E1 on a +z side surface of the medium by the image forming device 12. The first image M1 is, for example, an image whose density, lightness, hue, saturation, or the like is different from that of the region R3.

A second image M3 is an image of a mark or the like formed on a part of the fold F2 on the +z side surface of the medium by the image forming device 12. The second image M3 is, for example, an image whose density, lightness, hue, saturation, or the like is different from that of the region R2.

As shown in FIG. 1, the image forming device 12 forms an image on the medium before being folded by the folder 131. Since a folding motion of the folder 131 has a tolerance, exact positions of the folds to be formed cannot be predicted before folding. Therefore, the image forming device 12 forms the second image M3 so as to straddle the fold F2 in a range where the folder 131 is predicted to form the fold F2.

The image forming device 12 that forms the second image M3 is an example of the image forming device is configured to form a second image different from a region located within a predetermined range from the second position, on at least a part of a portion that is a mountain side of the fold of the medium before the medium is folded by the folder.

Figure 13A:
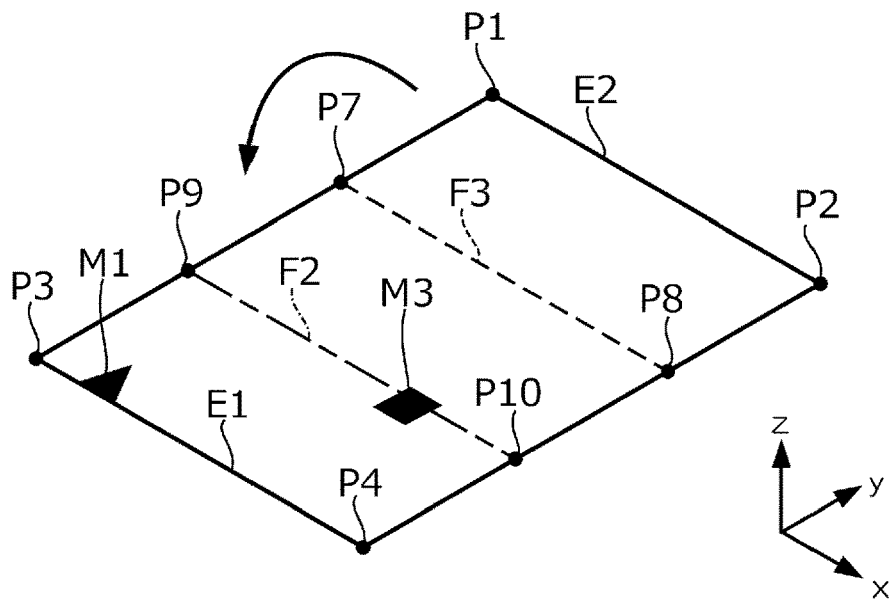
FIGS. 13A to 13C are perspective views showing a situation in which the medium is folded.
Figure 13B:
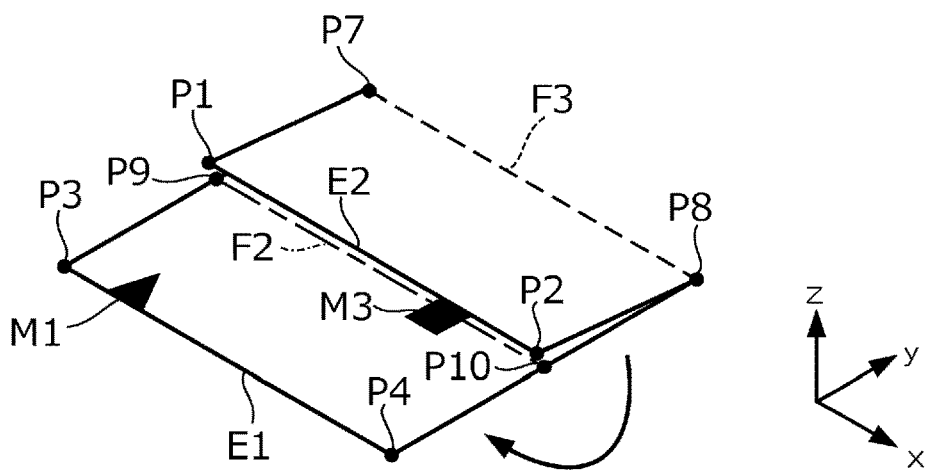
Figure 13C:
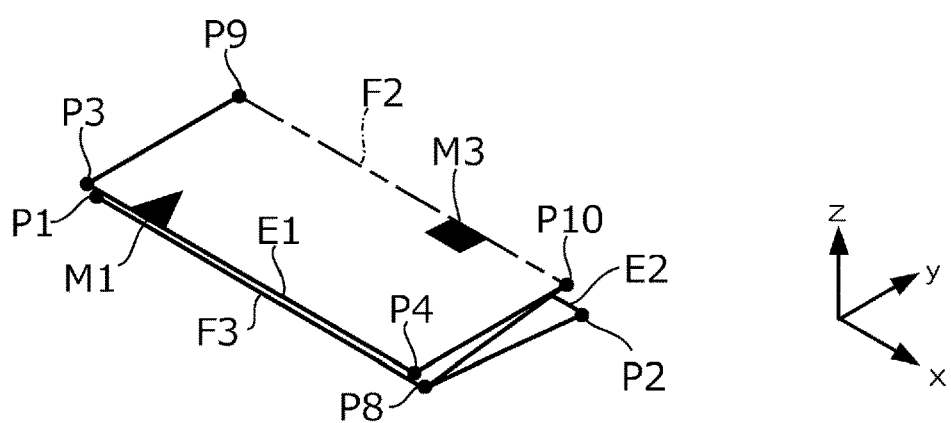

FIGS. 13A to 13C are perspective views showing a situation in which the medium is folded. The medium arranged along the xy plane is folded by the folder 131 such that the folds F2 and F3 are formed. At this time, the medium is folded such that a +z side of the fold F2 is the mountain side and a +z side of the fold F3 is the valley side. Therefore, as shown in FIG. 13A, for example, the side E2 moves in the +z direction and the −y direction along an arrows to be aligned with the fold F2. As a result, as shown in FIG. 13B, the fold F3 is formed in the medium.

When the folder 131 further folds the medium, as shown in FIG. 13B, the fold F3 of the medium moves in the −z direction and the −y direction along an arrow to be aligned with the side E1. As a result, as shown in FIG. 13C, the medium has a shape similar to Z of the alphabet letters when viewed along the direction of the fold. Therefore, this fold-in-three is also called a Z-fold.

Figure 14:
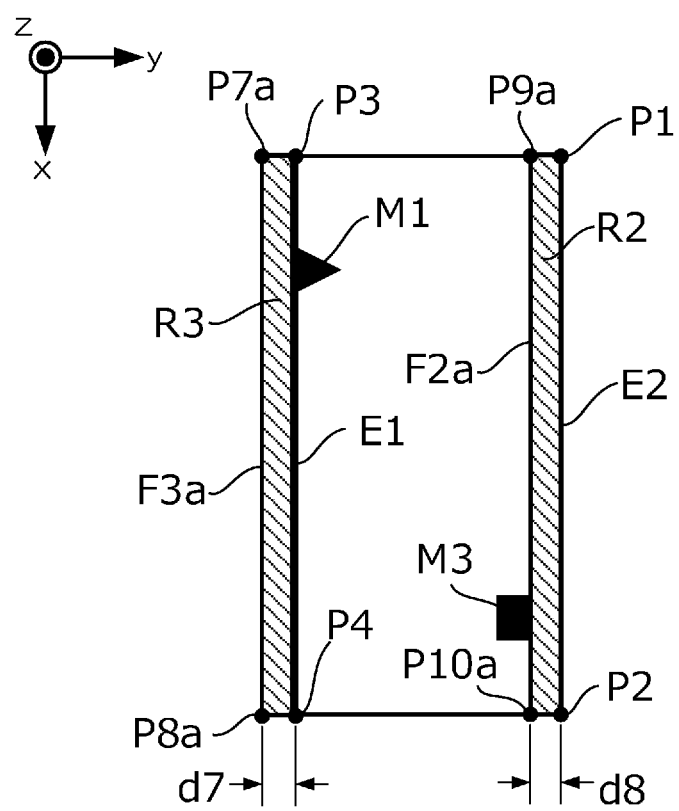
FIG. 14 is a diagram showing the medium when an actual fold deviates.

FIG. 14 is a diagram showing the medium when an actual fold deviates. Even if the folding method is set as shown in FIGS. 13A to 13C, when the folder 131 is actually folded, a fold that deviates from the setting is often formed.

For example, as shown in FIG. 14, a fold F3a actually formed by the folder 131 folding the medium have points P7a and P8a as both ends thereof, and deviates in the −y direction from the fold F3 shown in FIG. 11. When the medium in the folded state is viewed in the −z direction, as shown in FIG. 14, the side E1 overlaps the region R3, but is not aligned with the fold F3a, and a gap is formed between the fold F3a and the side E1. A distance between the fold F3a and the side E1 along the y-axis direction is a distance d7 as shown in FIG. 14.

For example, as shown in FIG. 14, a fold F2a actually formed by the folder 131 folding the medium have points P9a and P10a as both ends thereof, and deviates in the −y direction from the fold F2 shown in FIG. 11. When the medium in the folded state is viewed in the −z direction, as shown in FIG. 14, the fold F2a overlaps the region R2, but is not aligned with the side E2, and a gap is formed between the fold F2a and the side E2. A distance between the fold F2a and the side E2 along the y-axis direction is a distance d8 as shown in FIG. 14.

The processor 11 specifies positions of the side E1 and the fold F3a from a read image obtained by the reader 132 reading the medium shown in FIG. 14, using the first image M1 formed on the side E1, so as to measure the distance d7 from the read image.

The processor 11 specifies positions of the side E2 and the fold F2a from the read image using the second image M3 formed at the fold F2a, so as to measure the distance d8 from the read image.

Figure 15:
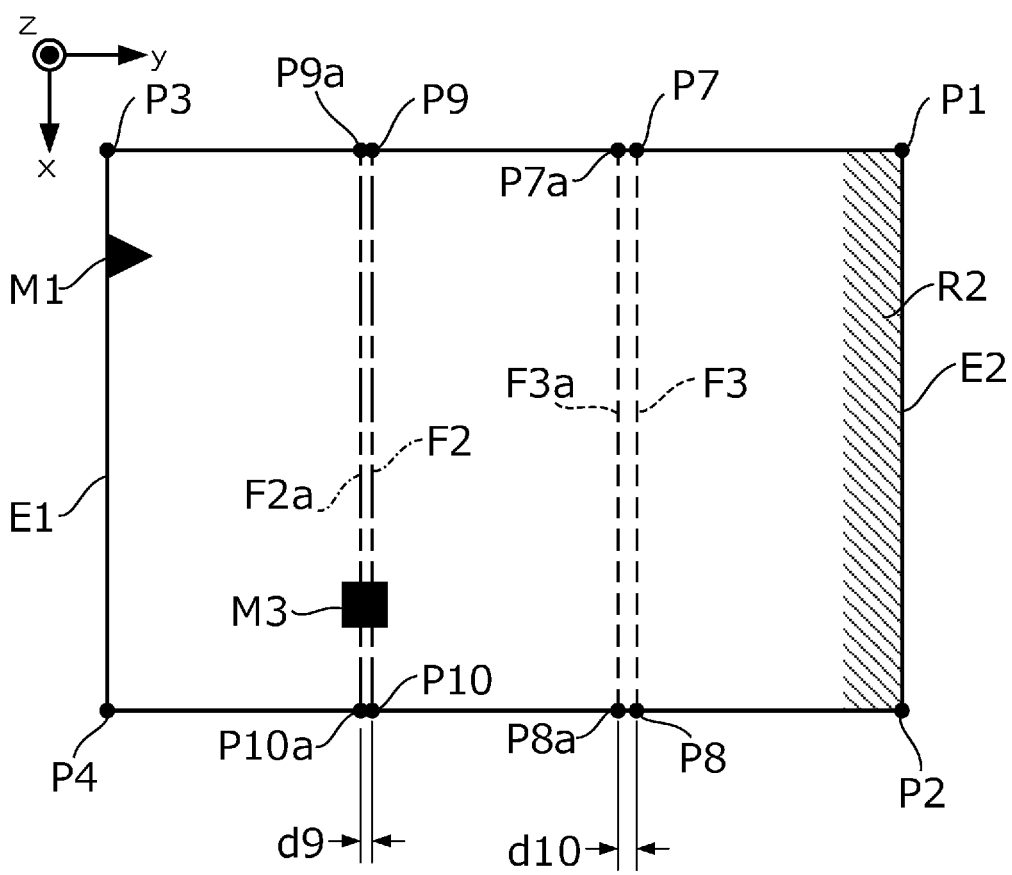
FIG. 15 is a diagram showing the medium in which folds F2a and F3a shown in FIG. 12 are unfolded.

FIG. 15 is a diagram showing the medium in which the folds F2a and F3a shown in FIG. 12 are unfolded. As described above, both of the folds F2a and F3a actually formed by the folder 131 folding the medium deviate in the −y direction from the set folds F2 and F3, and a distance between the fold F2a and the set fold F2 along the y-axis direction and a distance between the fold F3a and the set fold F3 along the y-axis direction are distances d9 and d10 as shown in FIG. 15. These distances d9 and d10 may be calculated from the distances d7 and d8.

Therefore, in this case, the processor 11 may use the measured distances d7 and d8 to estimate the distances d9 and d10, which are the distances for moving the fold, and adjust the folder 131 such that the positions of the folds are moved accordingly.

<3>

In the above modifications, the image forming device 12 forms the second image M3 at one position of the fold F2, but may also form the second image at each of two or more positions of the fold F2. In this case, the image forming device 12 is an example of the image forming device is configured to form the second image at each of two or more positions of the fold. The position of the fold F2 in the medium is clearly detected by connecting the boundaries between the two or more second images and the region R2.

<4>

As described above, the processor 11 may move the cleaner 126 to the position where the cleaner 126 is in contact with the intermediate transfer belt to perform the cleaning every time the number of prints exceeds the determined threshold value. Alternatively, the processor 11 may also cause the cleaner 126 to clean the intermediate transfer belt every time the image forming device 12 forms the first image M1. The processor 11 may control a cleaning mechanism (not shown) to clean a path through which the medium on which the first image M1 is formed has passed every time the image forming device 12 forms the first image M1. The cleaning mechanism or the cleaner 126 is an example of a cleaning unit configured to clean a path through which the medium has passed every time the image forming device forms the first image on the medium.

<5>

In the above exemplary embodiment, the first image M1 is formed simply on the side E1 of the four sides of the medium. Alternatively, the first images M1 may also be formed on the other sides. The image forming device 12 may not form any image at any side with which the folds formed by the folder 131 intersect. This is because when an image is to be formed on a side, the developer such as the toner is often supplied to a region protruding from the side, so that the inside of the image forming apparatus 1 is more likely to be contaminated. In this case, the folder 131 is an example of the folder is configured to fold the medium such that the fold does not intersect with any position on the side where the first image is formed by the image forming device.

<6>

In the above exemplary embodiment, the program executed by the processor 11 of the image forming apparatus 1 is an example of a program that causes a computer that controls a folder and an image forming device, to execute: acquiring an image obtained by reading a medium in a state of being folded by the folder; measuring a distance between a first image and a first position from the acquired image; and adjusting a position where the folder folds the medium according to the measured distance.

This program may be provided in a state of being stored in a computer readable recording medium, such as a magnetic recording medium (for example, a magnetic tape and a magnetic disk), an optical recording medium (for example, an optical disc), an magneto-optical recording medium, and a semiconductor memory. Further, this program may be downloaded via a communication line such as the Internet.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
a folder configured to fold a medium by forming a fold such that a side of the medium is aligned with a predetermined first position on the medium;
an image forming device configured to form a first image on a region different from a region located within a predetermined range from the first position, on at least a part of the side of the medium before the medium is folded by the folder; and
a processor programmed to:
control the folder and the image forming device:
acquire an image obtained by reading the medium in a state of being folded by the folder;
measure a distance between the first image and the first position from the acquired image; and
adjust a position where the folder folds the medium according to the measured distance.

2. The image forming apparatus according to claim 1, wherein the folder is configured to fold the medium such that the fold does not intersect with any position on the side where the first image is formed by the image forming device.

3. The image forming apparatus according to claim 2, wherein the image forming device is configured to form the first image at each of two or more positions on the side.

4. The image forming apparatus according to claim 3, wherein
the folder is configured to fold the medium at a position different from the fold such that the fold is aligned with a predetermined second position on the medium, and
the image forming device is configured to form a second image on a region different from a region located within a predetermined range from the second position, on at least a part of a portion that is a mountain side of the fold of the medium before the medium is folded by the folder.

5. The image forming apparatus according to claim 4, wherein the image forming device is configured to form the second image at each of two or more positions of the fold.

6. The image forming apparatus according to claim 2, wherein
the folder is configured to fold the medium at a position different from the fold such that the fold is aligned with a predetermined second position on the medium, and
the image forming device is configured to form a second image on a region different from a region located within a predetermined range from the second position, on at least a part of a portion that is a mountain side of the fold of the medium before the medium is folded by the folder.

7. The image forming apparatus according to claim 6, wherein the image forming device is configured to form the second image at each of two or more positions of the fold.

8. The image forming apparatus according to claim 1, wherein the image forming device is configured to form the first image at each of two or more positions on the side.

9. The image forming apparatus according to claim 8, wherein
the folder is configured to fold the medium at a position different from the fold such that the fold is aligned with a predetermined second position on the medium, and
the image forming device is configured to form a second image on a region different from a region located within a predetermined range from the second position, on at least a part of a portion that is a mountain side of the fold of the medium before the medium is folded by the folder.

10. The image forming apparatus according to claim 9, wherein the image forming device is configured to form the second image at each of two or more positions of the fold.

11. The image forming apparatus according to claim 1, wherein
the folder is configured to fold the medium at a position different from the fold such that the fold is aligned with a predetermined second position on the medium, and
the image forming device is configured to form a second image on a region different from a region located within a predetermined range from the second position, on at least a part of a portion that is a mountain side of the fold of the medium before the medium is folded by the folder.

12. The image forming apparatus according to claim 11, wherein the image forming device is configured to form the second image at each of two or more positions of the fold.

13. The image forming apparatus according to claim 1, wherein
the image forming device comprises a cleaning unit configured to clean a path through which the medium has passed every time the first image is formed on the medium.

14. An image forming apparatus comprising:

an image forming device configured to form a first image on at least one side among two sides at an alignment position on an opposite side to a folding position on a medium;

a folder configured to fold the medium on which the first image is formed by the image forming device such that the same image as the first image formed on the at least one side of the two sides at the alignment position is not on the other side when the medium is folded; and a processor programmed to:

control the folder and the image forming device:

acquire an image obtained by reading the medium in a state of being folded by the folder;

measure a distance between the first image and the first position from the acquired image; and adjust a position where the folder folds the medium according to the measured distance.

* * * * *